United States Patent
Tanaka et al.

(10) Patent No.: US 7,204,077 B2
(45) Date of Patent: Apr. 17, 2007

(54) ATMOSPHERIC PRESSURE COMBUSTION TURBINE SYSTEM

(75) Inventors: Kazuo Tanaka, Kobe (JP); Seiji Yamashita, Kobe (JP); Eiichi Harada, Kakogawa (JP); Norihiko Iki, Tsukuba (JP); Sanyo Takahashi, Tsukuba (JP); Hirohide Furutani, Tsukuba (JP)

(73) Assignees: Kawasaki Jukogyo Kabushiki Kaisha, Chuo-ku (JP); National Institute of Advanced Industrial Science & Technology, Tokyo (JP)

( * ) Notice: Subject to any disclaimer, the term of this patent is extended or adjusted under 35 U.S.C. 154(b) by 99 days.

(21) Appl. No.: 10/529,488

(22) PCT Filed: Oct. 3, 2003

(86) PCT No.: PCT/JP03/12739

§ 371 (c)(1),
(2), (4) Date: Mar. 29, 2005

(87) PCT Pub. No.: WO2004/033872

PCT Pub. Date: Apr. 22, 2004

(65) Prior Publication Data

US 2006/0162316 A1    Jul. 27, 2006

(30) Foreign Application Priority Data

Oct. 8, 2002    (JP) .............................. 2002-294533

(51) Int. Cl.
*F02C 3/30* (2006.01)
*F02C 3/34* (2006.01)
*F02C 7/10* (2006.01)

(52) U.S. Cl. ................. 60/39.41; 60/39.511; 60/39.52; 60/39.53

(58) Field of Classification Search ............... 60/39.41, 60/59.511, 39.52, 39.53, 39.56, 39.58, 39.59
See application file for complete search history.

(56) References Cited

U.S. PATENT DOCUMENTS

| 3,369,361 | A | * | 2/1968 | Craig ........................ 60/39.41 |
| 4,829,763 | A |   | 5/1989 | Rao |
| 5,148,670 | A | * | 9/1992 | Birch et al. ................. 60/39.41 |
| 6,298,654 | B1 | * | 10/2001 | Vermes et al. ............. 60/39.41 |

FOREIGN PATENT DOCUMENTS

CN    85 1 07411 A    9/1986

(Continued)

*Primary Examiner*—L. J. Casaregola
(74) *Attorney, Agent, or Firm*—Oliff & Berridge, PLC

(57) ABSTRACT

Techniques suitable for recovering energy from a high-temperature gas of an ordinary pressure are provided. A turbomachine has a turbine 16 and compressors 20 and 24. A combustor 12 is disposed at a stage above the turbine 16. A power generating system generates power by passing a working fluid for the turbomachine through the combustor 12, the turbine 16 and the compressors 20 and 24 in that order. An atmospheric pressure combustion turbine system includes: a regenerative heat exchanger 14 capable of cooling a high-temperature working gas discharged from the turbine 16 by making the high-temperature working gas exchange heat with a mixed gas produced by mixing an exhaust gas and air and moistened with hot water; coolers 22 and 26 connected to the entrance of the compressors 20 and 24, respectively, to cool the working gas by making the working gas exchange heat with water; and a humidifier 30 for producing a mixed gas by heating air by mixing part of the exhaust gas discharged from the compressor 24 in the air and humidifying the heated air with the hot water produced by heating water by the heat of the working gas through heat exchange. The mixed gas produced by the humidifier is supplied to the regenerative heat exchanger 14, the regenerative heat exchanger 14 produces a high-temperature, humid, mixed gas by making the mixed gas exchange heat with the high-temperature working gas discharged through the exit of the turbine 16 to heat the mixed gas, and the heated, high-temperature, humid, mixed gas is supplied to the combustor 12.

2 Claims, 4 Drawing Sheets

FOREIGN PATENT DOCUMENTS

| | | |
|---|---|---|
| JP | B1-52-034682 | 9/1977 |
| JP | A-10-259736 | 9/1998 |
| JP | A-10-259758 | 9/1998 |
| JP | A-11-072027 | 3/1999 |
| JP | A-2002-242700 | 8/2002 |
| JP | A-2003-262134 | 9/2003 |
| WO | WO 00/37785 A1 | 6/2000 |

* cited by examiner

ATMOSPHERIC PRESSURE COMBUSTION TURBINE SYSTEM

TECHNICAL FIELD

The present invention relates to an atmospheric pressure combustion turbine system that expands a high-temperature gas of the atmospheric pressure produced by atmospheric combustion in a gas turbine, recovers heat from the gas by a regenerative heat exchanger and a cooler, and sucks, pressurizes and discharges the gas by a compressor.

BACKGROUND ART

In a turbine engine provided with a turbine, such as a gas turbine, a compressor compresses air of the atmospheric pressure and supplies compressed air to a combustor, the combustor mixes fuel into the compressed air for combustion, and a turbine recovers power. Therefore, the pressure of the fuel must be higher than that of air at the exit of the compressor. Accordingly, atmospheric combustion is impossible and heat of the atmospheric exhaust gas cannot be used. Therefore, the turbine engine provided with a gas turbine has difficulty in using various gaseous fuels, solid fuels and unused high-temperature gases. It is structurally impossible for the turbine engine to reduce emission of heat from the system by circulating the exhaust gas like gas engines do, which is disadvantageous in respect of thermodynamic cycle.

As mentioned above, in the conventional gas turbine, the pressurized fuel must be supplied to the combustor because the pressure in the combustor is high. Since the high-temperature, high-pressure gas flows into the turbine, it is difficult to recover power from unused, high-temperature or atmospheric exhaust gases produced by manufacturing processes by the turbine.

To recover heat from a high-temperature exhaust gas discharged from a high-temperature heating furnace, a ceramic heat exchanger formed of highly heat-resistant ceramic materials is necessary. The cost of heat recovery using such a ceramic heat exchanger is intolerably high. Even if heat could be recovered, electric power cannot be recovered.

A prior art atmospheric combustion turbine that expands a high-temperature gas of the atmospheric pressure produced by atmospheric combustion in a gas turbine, recovers heat from the gas by a regenerative heat exchanger and a cooler, and sucks, pressurizes and discharges the gas by a compressor is disclosed in, for example, JP 2002-242700 A.

DISCLOSURE OF THE INVENTION

As mentioned above, a system that circulates an exhaust gas to reduce waste heat cannot be constructed by using a conventional gas turbine. However, such a system can be realized if an internal combustion engine capable of operating on an atmospheric, high-temperature gas is available.

A system including a high-temperature heating furnace using an atmospheric, high-temperature gas is able to generate electric power by using the heat of the atmospheric, high-temperature gas produced by the heating furnace by a generator disposed at the exit of the high-temperature heating furnace and capable of operating on the energy of the atmospheric, high-temperature gas.

The present invention has been made in view of such circumstances and it is therefore an object of the present invention to provide an atmospheric pressure combustion turbine system including a gas turbine completely different from the conventional gas turbine and capable of recovering energy from a high-temperature gas of the atmospheric pressure, designed to execute a cycle in which a high-temperature gas of the atmospheric pressure expands in the gas turbine, the gas is cooled for heat recovery and the cooled gas is supplied to a compressor at a subsequent stage to generate power, capable of achieving heat utilization through the circulation of an exhaust gas and of operating at a very high efficiency through the utilization of hot water used for cooling the gas.

Another object of the present invention is to provide an atmospheric combustion gas turbine system including a gas turbine disposed at the exit of a high-temperature heating furnace so as to suck in a high-temperature exhaust gas of the atmospheric pressure discharged from the heating furnace to generate electric power by using the heat of the exhaust gas discharged from the heating furnace, a compressor, and a regenerator interposed between the gas turbine and the compressor and capable of recovering heat from a gas discharged from the gas turbine, of heating air by the recovered heat and of supplying the heated high-temperature air to the heating furnace to improve efficiency.

An atmospheric pressure combustion turbine system in a first aspect of the present invention as a power generating system including a turbomachine having a turbine and at least one compressor, and a combustor at a stage above the turbine, and capable of generating a shaft output by passing a working fluid for driving the turbomachine through the combustor, the turbine and the compressor in that order includes: a regenerative heat exchanger capable of cooling a high-temperature working gas discharged from the turbine by making the high-temperature working gas exchange heat with a mixed gas produced by mixing an exhaust gas and air and moistened with hot water; at least one cooler connected to the entrance of each compressor to cool the working gas by making the working gas exchange heat with water; and a humidifier for producing a mixed gas by heating air by mixing part of the exhaust gas discharged from the compressor in the air and humidifying the heated air with the hot water produced by heating water by the heat of the working gas through heat exchange; wherein the mixed gas produced by the humidifier is supplied to the regenerative heat exchanger, the regenerative heat exchanger produces, a high-temperature, humid, mixed gas by making the mixed gas exchange heat with the high-temperature working gas discharged through the exit of the turbine to heat the mixed gas, and the heated, high-temperature, humid, mixed gas is supplied to the combustor. 1 and 2).

An atmospheric pressure combustion turbine system in a second aspect of the present invention as a power generating system including a turbomachine having a turbine and at least one compressor, and a combustor at a stage above the turbine, and capable of generating a shaft output by passing a working fluid for driving the turbomachine through the combustor, the turbine and the compressor in that order includes: a regenerative heat exchanger capable of cooling a high-temperature working gas discharged from the turbine by making the high-temperature working gas exchange heat with a mixed gas produced by mixing an exhaust gas and high-temperature, humid air supplied from a high-temperature, humid air generator, heating the mixed gas and humidifying the heated mixed gas with hot water; at least one cooler disposed at the entrance of each compressor to cool the working gas by making the working gas exchange heat with water; and a humidifier capable of heating the high-temperature, humid air supplied from the high-temperature, humid air generator by mixing part of the exhaust gas discharged from the compressor in the high-temperature, humid air and of humidifying the heated high-temperature, humid air with the hot water produced by heating water by the heat of the working gas through heat exchange; wherein the mixed gas produced by the humidifier is supplied to the regenerative heat exchanger, the regenerative heat exchanger produces, a heated, high-temperature, humid, mixed gas by making the mixed gas exchange heat with the high-temperature working gas at the exit of the turbine to heat the mixed gas, and the heated, high-temperature, humid, mixed gas is supplied to the combustor (FIG. 3).

An atmospheric pressure combustion turbine system in a third aspect of the present invention as a power generating system including a turbomachine having a turbine and at least one compressor, and a combustor at a stage above the turbine of the turbomachine, and capable of generating a shaft output by passing a working fluid for the turbomachine through the combustor, the turbine and the compressor in that order, said atmospheric pressure combustion turbine system includes: a regenerative heat exchanger capable making the turbine generate power by supplying a high-temperature gas produced by an industrial heating furnace as a working fluid to the turbine and of preheating fresh air and cooling the high-temperature gas by making the high-temperature gas discharged from the turbine exchange heat with fresh air; and at least one cooler disposed at the entrance of each compressor to cool the working gas by making the working gas exchange heat with a cooling medium; wherein the preheated air heated by the regenerative heat exchanger is supplied to the heating furnace as combustion air (FIG. 4).

In the atmospheric pressure combustion turbine system according to the present invention, the compressor is a plurality of compressors, and the cooler is a plurality of coolers.

BEST MODE FOR CARRYING OUT THE INVENTION

Preferred embodiments of the present invention will be described. It is to be understood that the present invention is not limited in its practical application to those embodiments specifically described herein and many changes and variations may be made therein without departing from the scope of the present invention.

Figure 1:
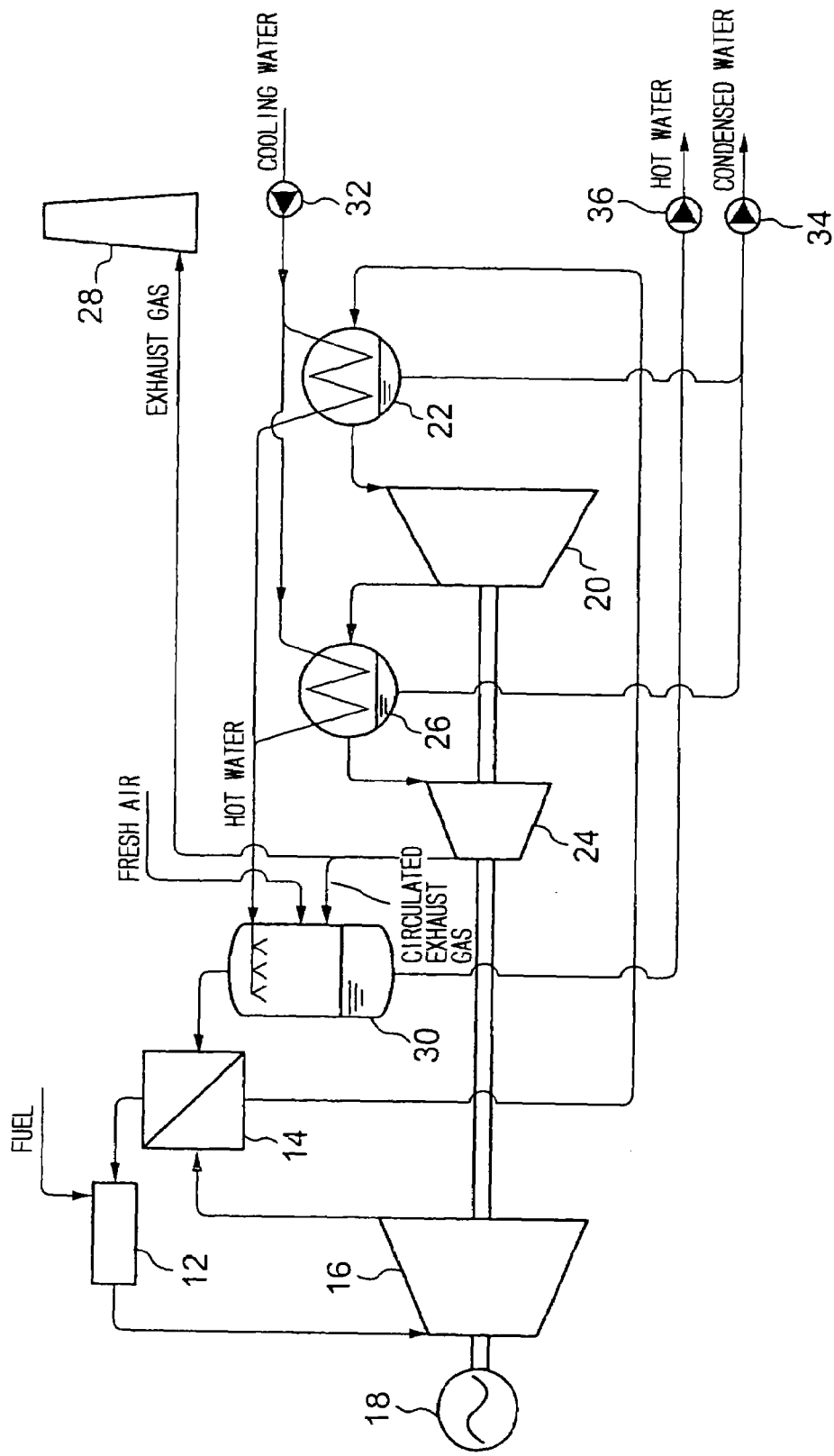
FIG. 1 is a diagrammatic view of an atmospheric pressure combustion turbine system in a first embodiment according to the present invention.

Referring to FIG. 1 showing an atmospheric pressure combustion turbine system in a first embodiment according to the present invention, a fuel of the atmospheric pressure is fed to a combustor 12. The interior of the combustor 12 is kept at a reduced pressure below the atmospheric pressure. A humid, mixed gas produced by mixing preheated air heated by a regenerative heat exchanger 14 and an exhaust gas is supplied at a reduced pressure slightly lower than the atmospheric pressure into the combustor 12. Since the fuel of the atmospheric pressure is fed to the combustor 12 without increasing the pressure of the fuel, the atmospheric pressure combustion turbine system does not need any fuel compressor.

A turbine 16 generates power by expanding the high-temperature combustion gas of the atmospheric pressure discharged from the combustor 12 to drive a power generator 18 for power generation.

The high-temperature exhaust gas discharged from the turbine 16 is supplied to the regenerative heat exchanger 14. The regenerative heat exchanger 14 makes a humid, air-exhaust mixed gas exchange heat with the high-temperature exhaust gas to cool the high-temperature exhaust gas and to preheat the humid, air-exhaust mixed gas. The high-temperature, humid air-exhaust mixed gas is supplied as combustion air to the combustor 12. Thus the amount of heat emitted outside the atmospheric pressure combustion turbine system can be reduced, the efficiency of the atmospheric pressure combustion turbine system can be improved and the output of the turbine 16 can be increased by increasing the flow of the high-temperature combustion gas through the turbine 16.

The exhaust gas cooled by heat exchange with the humid, air-exhaust mixed gas is cooled efficiently again by heat exchange with water before reaching the entrance of a compressor. In FIG. 1, a low-pressure cooler 22 has an exit connected to the entrance of a low-pressure compressor 20. The low-pressure cooler 22 condenses moisture contained in the exhaust gas into water to reduce the flow of the exhaust gas into the low-pressure compressor 20 and to reduce power necessary for compressing the exhaust gas by decreasing the temperature of the exhaust gas. A high-pressure cooler 26 has an entrance connected to the exit of the low-pressure compressor 20 and an exit connected to the entrance of a high-pressure compressor 24. The high-pressure cooler 26 condenses moisture contained in the exhaust gas into water to reduce the flow of the exhaust gas into the high-pressure compressor 24 and to reduce power necessary for compressing the exhaust gas by decreasing the temperature of the exhaust gas. Hot water heated by heat exchange with the exhaust gas in the low-pressure cooler 22 and the high-pressure cooler 26 is supplied to a humidifier 30. Shown in FIG. 1 are a cooling water feed pump 32, a condensed water pump 34 and a hot water pump 36.

Part of the compressed exhaust gas compressed by the compressor, namely, the low-pressure compressor 20 or the high-pressure compressor 24, is supplied to the humidifier 30 and the remainder is discharged outside through an exhaust funnel 28.

The humidifier 30 mixes fresh air and part of the exhaust gas discharged from the high-pressure compressor 24 to produce an air-exhaust mixed gas and sprays hot water produced by the low-pressure cooler 22 and the high-pressure cooler 26 into the air-exhaust mixed gas to produce a humid air-exhaust mixed gas. The regenerative heat exchanger 14 heats the humid air-exhaust mixed gas by the heat of the high-temperature exhaust gas discharged from the turbine 16 through heat exchange to produce a high-temperature, humid combustion air. The high-temperature, humid combustion air is supplied to the combustor 12. Since the temperature of the high-temperature humid combustion air is high, fuel consumption can be reduced.

The characteristics of a turbine thermodynamic cycle of utilizing the heat of the exhaust gas and the hot water in the foregoing manner will be described in connection with the operation of the atmospheric pressure combustion turbine system in the first embodiment shown in FIG. 2.

About 80% of the exhaust gas discharged from the high-pressure compressor 24 is mixed with fresh air to use the sensible heat of the exhaust gas of about 90° C. for improving the efficiency of the atmospheric pressure combustion turbine system. When the exhaust gas is circulated by such an exhaust gas circulating system, the quantity of heat dissipated into external systems can be reduced. Since a mixed gas of about 40° C. can be produced by mixing fresh air of an ordinary temperature and the exhaust gas of about 90° C., water is evaporated in the humidifier 30 at an evaporation rate higher than that at which water will be evaporated when only fresh air is supplied to the humidifier 30. Thus, the absolute humidity of the mixed gas, namely, the mass of water contained in a unit mass of the mixed gas, increases because a unit mass of a gas of a higher temperature is able to contain an larger quantity of water.

Since the humidifier 30 uses the hot water produced by heating the cooling water by the heat of the exhaust gas, the heat of the exhaust gas can be regenerated. Since the hot water of a temperature as high as 80° C. holds a large quantity of thermal energy as compared with water of an ordinary temperature, the hot water can be evaporated at a high evaporation rate without decreasing the temperature of the mixed gas.

The water content of the combustion gas produced by the combustor 12 is increased by increasing the water content of the combustion air by the humidifier to enhance the output. The exhaust gas used for driving the turbine 16 and cooled by the regenerative heat exchanger 14 is further cooled the by low-pressure cooler 22 and the high-pressure cooler 26. Consequently, moisture contained in the exhaust gas is condensed and the quantity of the exhaust gas decrease. Thus power necessary for driving the compressors can be reduced. Water extracted from the exhaust gas and drained is recovered.

Figure 2:
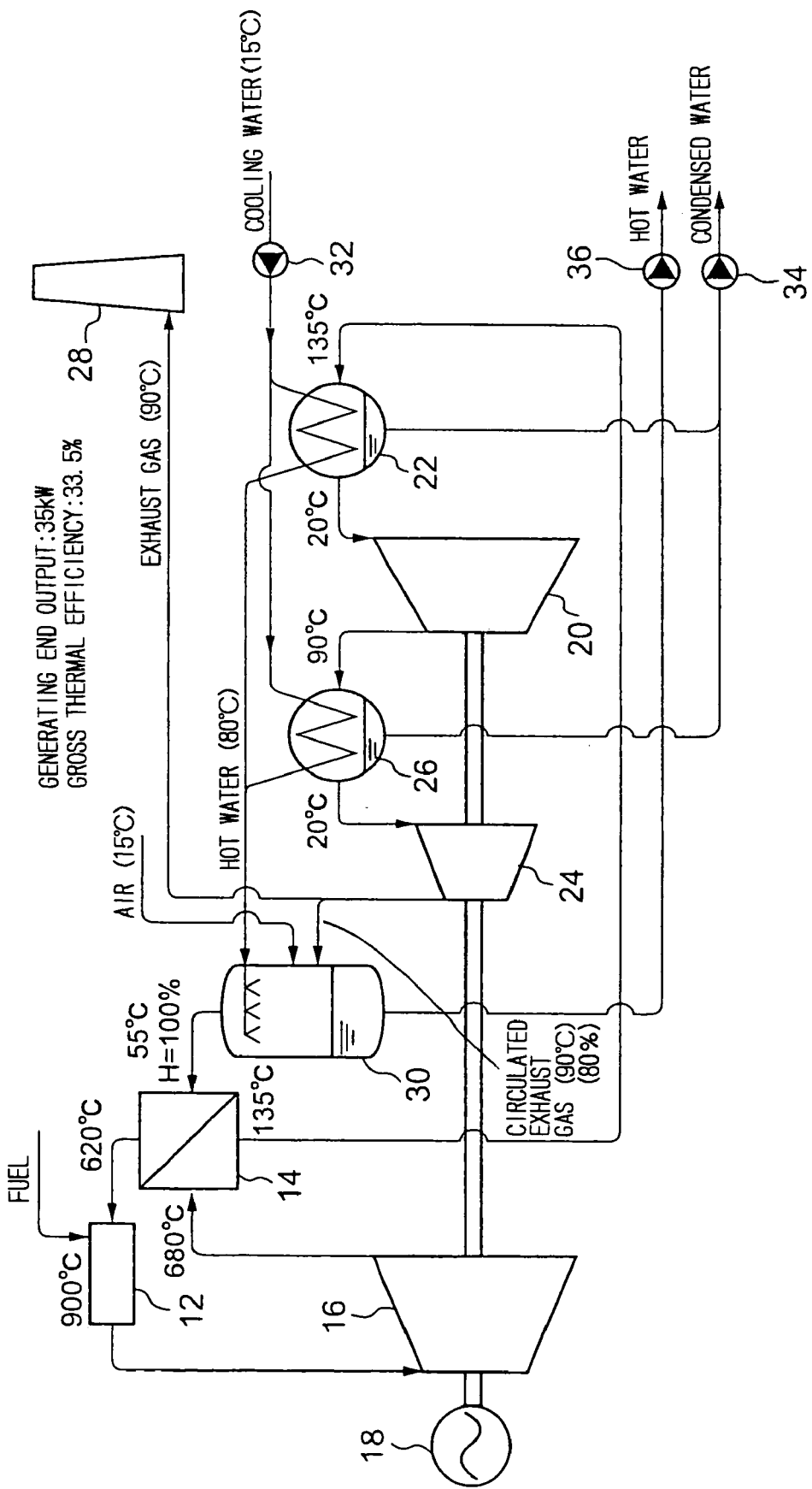
FIG. 2 is a diagrammatic view of assistance in explaining the operation of the atmospheric pressure combustion turbine system in the first embodiment.

In the operation shown in FIG. 2, whereas the power generating efficiency of an atmospheric pressure combustion turbine system not operating in an exhaust gas circulating system is 28.1%, the power generating efficiency is 33.5% or above when the atmospheric pressure combustion turbine system in the first embodiment is used.

Figure 3:
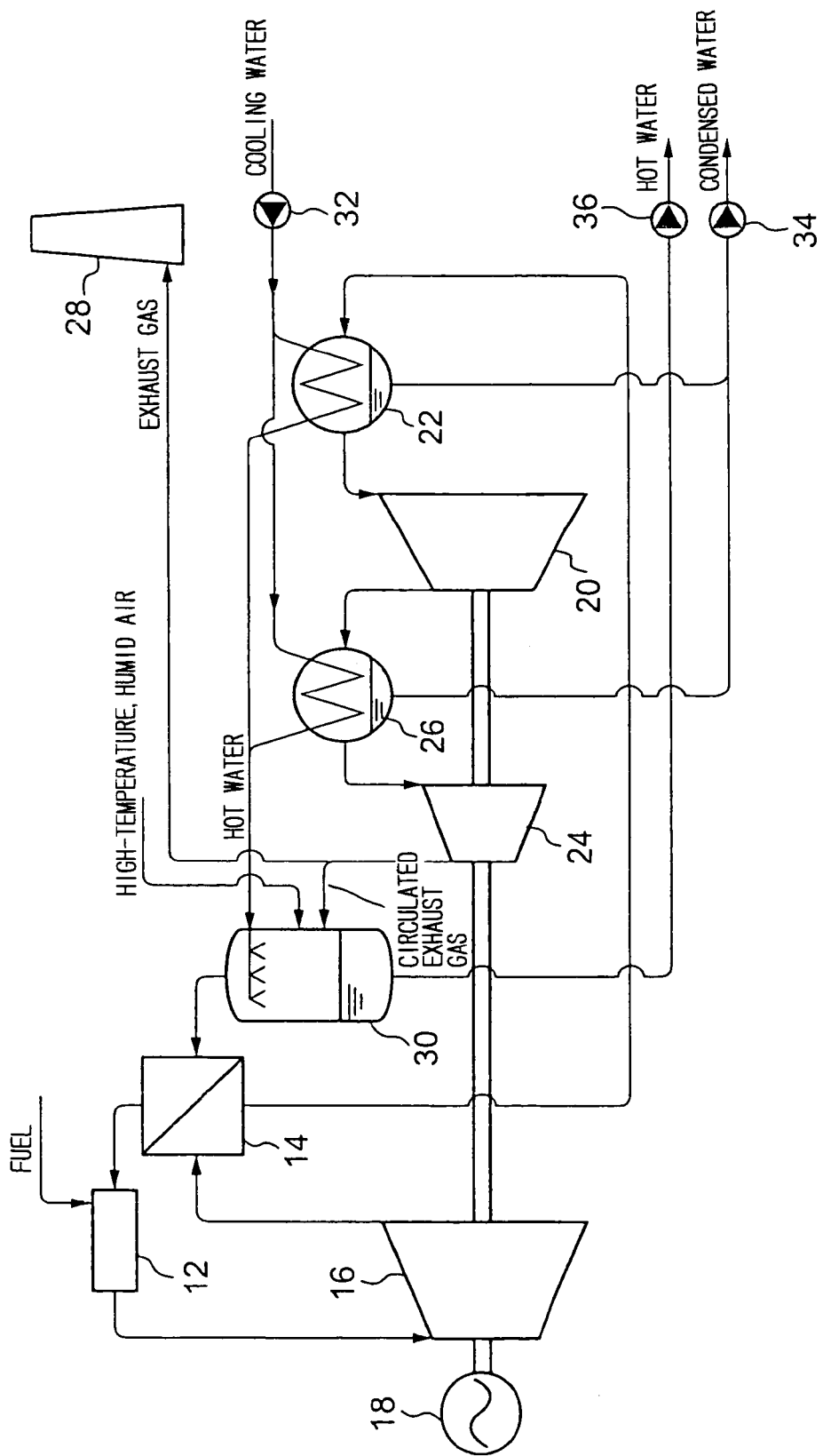
FIG. 3 is a diagrammatic view of an atmospheric pressure combustion turbine system in a second embodiment according to the present invention.

Referring to FIG. 3 showing an atmospheric pressure combustion turbine system in a second embodiment according to the present invention, a fuel of the atmospheric pressure is fed to a combustor 12. The interior of the combustor 12 is kept at a reduced pressure below the atmospheric pressure. A humid, mixed gas produced by mixing preheated, high-temperature, humid air heated by a regenerative heat exchanger 14 and an exhaust gas is supplied at a reduced pressure slightly lower than the atmospheric pressure into the combustor 12. Since the fuel of the atmospheric pressure is fed to the combustor 12 without increasing the pressure of the fuel, the atmospheric pressure combustion turbine system does not need any fuel compressor.

A turbine 16 generates power by expanding the high-temperature combustion gas of the atmospheric pressure discharged from the combustor 12 to drive a power generator 18 for power generation.

The high-temperature exhaust gas discharged from the turbine 16 is supplied to the regenerative heat exchanger 14. The regenerative heat exchanger 14 makes a high-temperature, humid, air-exhaust mixed gas supplied from a humidifier 30 exchange heat with the high-temperature exhaust gas to cool the high-temperature exhaust gas and to preheat the high-temperature, humid, air-exhaust mixed gas. The high-temperature, humid air-exhaust mixed gas is supplied as combustion air to the combustor 12. Thus the amount of heat emitted outside the atmospheric pressure combustion turbine system can be reduced, the efficiency of the atmospheric pressure combustion turbine system can be improved and the output of the turbine 16 can be increased by increasing the flow of the high-temperature combustion gas through the turbine 16.

The exhaust gas cooled by heat exchange with the high-temperature, humid, air-exhaust mixed gas is cooled efficiently again by heat exchange with water before reaching the entrance of a compressor. In FIG. 3, a low-pressure cooler 22 has an exit connected to the entrance of a low-pressure compressor 20. The low-pressure cooler 22 condenses moisture contained in the exhaust gas into water to reduce the flow of the exhaust gas into the low-pressure compressor 20 and to reduce power necessary for compressing the exhaust gas by decreasing the temperature of the exhaust gas. A high-pressure cooler 26 has an entrance connected to the exit of the low-pressure compressor 20 and an exit connected to the entrance of a high-pressure compressor 24. The high-pressure cooler 26 condenses moisture contained in the exhaust gas into water to reduce the flow of the exhaust gas into the high-pressure compressor 24 and to reduce power necessary for compressing the exhaust gas by decreasing the temperature of the exhaust gas. Hot water heated by heat exchange with the exhaust gas in the low-pressure cooler 22 and the high-pressure cooler 26 is supplied to a humidifier 30.

Part of the compressed exhaust gas compressed by the compressor, namely, the low-pressure compressor 20 or the high-pressure compressor 24, is supplied to the humidifier 30 and the remainder is discharged outside through an exhaust funnel 28.

The humidifier 30 mixes high-pressure, humid air supplied from a high-temperature, humid air source and part of the exhaust gas discharged from the high-pressure compressor 24 to produce an air-exhaust mixed gas and sprays hot water produced by the low-pressure cooler 22 and the high-pressure cooler 26 into the air-exhaust mixed gas to produce a humid air-exhaust mixed gas. The high-temperature, humid air source is, for example, a surface processing machine for a rolling process in a steelworks or a quenching machine for steel manufacturing. The regenerative heat exchanger 14 heats the humid air-exhaust mixed gas by the heat of the high-temperature exhaust gas discharged from the turbine 16 through heat exchange to produce high-temperature, humid combustion air. The high-temperature, humid combustion air is supplied to the combustor 12. Since the temperature of the high-temperature humid combustion air is high, fuel consumption can be reduced. The use of the unused, high-temperature, humid air further increases the output and efficiency of the turbine.

The atmospheric pressure combustion turbine system in the second embodiment is similar in other respects as the atmospheric pressure combustion turbine system in the first embodiment.

Figure 4:
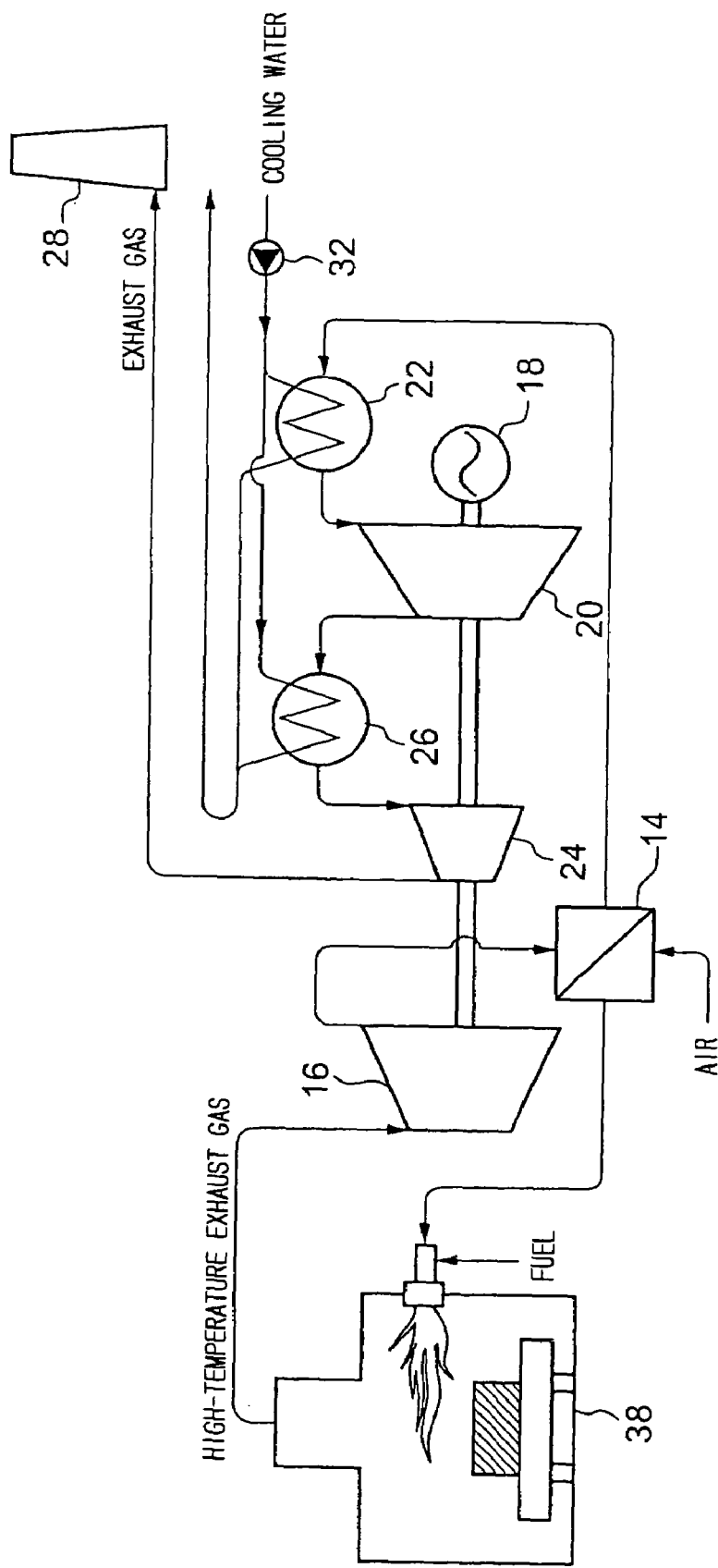
FIG. 4 is a diagrammatic view of an atmospheric pressure combustion turbine system in a third embodiment according to the present invention.

Referring to FIG. 4 showing an atmospheric pressure combustion turbine system in a third embodiment according to the present invention, a high-temperature exhaust gas produced by a high-temperature heating furnace 38 to be applied to various processes is supplied to a turbine 16. Since the turbine 16 needs an atmospheric, high-temperature gas, the atmospheric, high-temperature exhaust gas produced by the industrial high-temperature heating furnace 38 can be directly supplied to the gas turbine 16. The high-temperature heating furnace 38 is, for example, a rolling mill furnace, a ladle heater, a batch-type forging furnace, a round bar tip heating furnace, a bogie-type forging furnace, a walking-beam forging furnace, a continuous bright-annealing furnace, a continuous annealing furnace, a continuous aluminum annealing furnace, a batch-type carburizing furnace, a nonoxidizing pot-furnace, a batch-type nitrocarburizing furnace, a batch type normalizing furnace, an absorption gas generator, an aluminum reverberatory furnace, an aluminum holding furnace, an aluminum immersion holding furnace, a lead-iron ladle-type holding furnace, an aluminum chip melting furnace, an aluminum quick-melting holding furnace and a regenerative deodorizing apparatus.

The power generator 18 is driven for power generation by power generated through the expansion of the high-temperature exhaust gas supplied from the high-temperature heating furnace 38 in the turbine 16. The exhaust gas discharged from the turbine 16 is cooled through heat exchange with fresh air in the regenerative heat exchanger 14. The high-temperature air preheated by the regenerative heat exchanger 14 is used as combustion air for the high-temperature heating furnace 38. Thus the turbine exhaust heat recovered by the regenerative heat exchanger 14 can be recycled to reduce the fuel consumption of the high-temperature heating furnace 38. The temperature of the exhaust gas at the exit of the turbine 16 is in the range of about 600 to about 700° C. Therefore, the regenerative heat exchanger 14 may be formed of inexpensive materials, such as stainless steels. A heat exchanger is intended to be connected to the exit of the high-temperature heating furnace 38 for heat recovery, expensive materials, such as ceramic materials, must be used to build the heat exchanger because, in some cases, the temperature of the exhaust gas discharged from the high-temperature heating furnace 38 is 100° C. or higher. The regenerative heat exchanger 14 of the atmospheric pressure combustion turbine system in the third embodiment can be manufactured at low costs, and the atmospheric pressure combustion turbine system is able to generate electric power by the heat recovered from the high-temperature exhaust gas discharged from the high-temperature heating furnace 38.

The exhaust gas cooled by heat exchange with fresh air is cooled efficiently by heat exchange with a fluid, such as water, before being supplied to the compressor. In the atmospheric pressure combustion turbine system shown in FIG. 4, a low-pressure cooler 22 connected to the entrance of a low-pressure compressor 20 decreases the temperature of the exhaust gas and condenses moisture contained in the exhaust gas, a high-pressure cooler 26 connected to the exit of the low-pressure compressor 20 and the entrance of a high-pressure compressor 24 decreases the temperature of the exhaust gas and condenses moisture contained in the exhaust gas. Thus the quantity of the exhaust gas is reduced before the exhaust gas is supplied to the compressors to reduce power necessary for driving the compressors. The fluid to be used by the coolers for cooling the exhaust gas by heat exchange is not limited to water and may be seawater, deep-sea water or liquefied natural gas. Water is heated and liquefied natural gas is converted into natural gas. Low-temperature deep-sea water may be effectively used for cooling. Although inferior in cooling efficiency, air may be used as the cooling fluid for the coolers.

The exhaust gas compressed by the compressor, namely, the low-pressure compressor 20 or the high-pressure compressor 24, is emitted outside through an exhaust funnel 28.

Naturally, the atmospheric pressure combustion turbine system in the third embodiment is capable carrying out the turbine thermodynamic cycle of utilizing the heat of the exhaust gas and the hot water carried out by the first and the second embodiment.

The present invention has the following effects.

(1) The exhaust gas discharged from the compressor is used as combustion air to reduce the quantity of heat dissipated into external systems and to improve efficiency. Hot water obtained by cooling the exhaust gas before the exhaust gas is supplied to the compressor is brought into direct contact with combustion air to supply high-temperature, humid air as combustion air to the combustor. Consequently, the working gas can be supplied at an increased flow rate to the turbine, the output of the turbine can be increased and fuel consumption of the combustor can be reduced.

(2) Use of combustion air having a high moisture content increases the moisture content of the combustion gas produced by the combustor and enhances the output of the turbine. The cooler condenses moisture contained in the exhaust gas used for driving the turbine and passed through the regenerative heat exchanger to reduce the quantity of the exhaust gas to be supplied to the compressor. Consequently, power for driving the compressor can be reduced.

(3) Effective use of High-temperature, humid air generated by manufacturing processes as combustion air further enhances the effects mentioned in (1) and (2).

(4) Since the atmospheric pressure combustion turbine system is capable of atmospheric combustion and atmospheric exhaust heat utilization, electric power can be generated by heat recovered from the high-temperature exhaust gas of an ordinary pressure discharged from a high-temperature heating furnace by the turbine connected to the exit of the high-temperature heating furnace. The fuel consumption of the heating furnace can be reduced by supplying high-temperature air heated by heat recovered by the regenerative heat exchanger connected to the exit of the turbine to the heating furnace.

(5) Electric power can be generated by driving the turbine by the high-temperature exhaust gas generated by manufacturing processes. The regenerative heat exchanger having a heat-withstand capacity lower than that of a heat exchanger that recovers heat directly from a high-temperature exhaust gas reduces the cost of the atmospheric pressure combustion turbine system.

The invention claimed is:

1. An atmospheric pressure combustion turbine system as a power generating system including a turbomachine having a turbine and at least one compressor, and a combustor at a stage above the turbine, and capable of generating a shaft output by passing a working fluid for driving the turbomachine through the combustor, the turbine and the compressor in that order, said atmospheric pressure combustion turbine system comprising:

a regenerative heat exchanger capable of cooling a high-temperature working gas discharged from the turbine by making the high-temperature working gas exchange heat with a mixed gas produced by mixing an exhaust gas and air and moistened with hot water;

at least one cooler connected to the entrance of each compressor to cool the working gas by making the working gas exchange heat with water; and a humidifier for producing a mixed gas by heating air by mixing part of the exhaust gas discharged from the compressor in the air and humidifying the heated air with the hot water produced by heating water by the heat of the working gas through heat exchange;

wherein the mixed gas produced by the humidifier is supplied to the regenerative heat exchanger, the regenerative heat exchanger produces a high-temperature, humid, mixed gas by making the mixed gas exchange heat with the high-temperature working gas discharged through the exit of the turbine to heat the mixed gas, and the heated, high-temperature, humid, mixed gas is supplied to the combustor.

2. An atmospheric pressure combustion turbine system as a power generating system including a turbomachine having a turbine and at least one compressor, and a combustor at a stage above the turbine, and capable of generating a shaft output by passing a working fluid for driving the turbomachine through the combustor, the turbine and the compressor in that order, said atmospheric pressure combustion turbine system comprising:

a regenerative heat exchanger capable of cooling a high-temperature working gas discharged from the turbine by making the high-temperature working gas exchange heat with a mixed gas produced by mixing an exhaust gas and high-temperature, humid air supplied from a high-temperature, humid air generator, heating the mixed gas and humidifying the heated mixed gas with hot water;

at least one cooler disposed at the entrance of each compressor to cool the working gas by making the working gas exchange heat with water; and a humidifier capable of heating the high-temperature, humid air supplied from the high-temperature, humid air generator by mixing part of the exhaust gas discharged from the compressor in the high-temperature, humid air and of humidifying the heated high-temperature, humid air with the hot water produced by heating water by the heat of the working gas through heat exchange;

wherein the mixed gas produced by the humidifier is supplied to the regenerative heat exchanger, the regenerative heat exchanger produces a heated, high-temperature, humid, mixed gas by making the mixed gas exchange heat with the high-temperature working gas at the exit of the turbine to heat the mixed gas, and the heated, high-temperature, humid, mixed gas is supplied to the combustor.

* * * * *